United States Patent [19]

Casanova

[11] Patent Number: 5,267,912

[45] Date of Patent: Dec. 7, 1993

[54] AUTOMATIC MECHANICAL TRANSMISSION FOR GENERAL PURPOSES

[76] Inventor: Juan G. Casanova, Casilla 3444 - Centro de Casillas, Santiago, Chile

[21] Appl. No.: 728,183

[22] Filed: Jul. 10, 1991

[30] Foreign Application Priority Data

Jul. 25, 1990 [CL] Chile ..................................... 593-90

[51] Int. Cl.$^5$ .............................................. F16H 3/74
[52] U.S. Cl. .................................... 475/181; 475/255; 192/20
[58] Field of Search ................... 475/255, 181; 192/20

[56] References Cited

U.S. PATENT DOCUMENTS

| | | | |
|---|---|---|---|
| Re. 19,080 | 2/1934 | Greenwald | 475/255 X |
| 1,810,282 | 10/1926 | Ljungstrom | 475/255 X |
| 2,960,036 | 6/1976 | Moller | 475/255 |
| 3,263,529 | 8/1966 | Borisoff | 475/255 |
| 3,447,398 | 6/1969 | Chen | 475/255 |
| 4,907,474 | 3/1990 | Bolger | 475/255 X |

FOREIGN PATENT DOCUMENTS

| | | | |
|---|---|---|---|
| 37082 | 4/1990 | Chile . | |
| 2612035 | 9/1977 | Fed. Rep. of Germany | 475/255 |
| 305297 | 7/1971 | U.S.S.R. | 475/255 |
| 773342 | 10/1980 | U.S.S.R. | 475/255 |
| 787760 | 12/1980 | U.S.S.R. | 475/255 |
| 881438 | 11/1981 | U.S.S.R. | 475/255 |
| 1460465 | 2/1989 | U.S.S.R. | 475/255 |

*Primary Examiner*—Leslie A. Braun
*Assistant Examiner*—Ryan W. Massey
*Attorney, Agent, or Firm*—Amster, Rothstein & Ebenstein

[57] ABSTRACT

A mechanical-centrifugal clutch, without friction surfaces, includes a planetary support for receiving input torque and a sun gear for developing output torque without any free wheeling mechanism. A plurality of at least four weighted planetary gears is driven by the planetary support and drives the sun gear. The weighted planetary gears include centrifugal effect masses and are disposed in a special relative shift relative to one another for imparting substantial continuity in the transmission of power.

3 Claims, 5 Drawing Sheets

AUTOMATIC MECHANICAL TRANSMISSION FOR GENERAL PURPOSES

BACKGROUND OF THE INVENTION

Clutches for vehicles, as known today, can be classified in two main groups: solid clutches and fluid clutches.

A solid clutch is one which uses friction surfaces to transmit torque progressively from input shaft to output shaft. The disadvantages of such clutches are:

Friction surfaces suffer overheating and wearing out.
Low efficiency at intermediate positions.
In general, it is difficult to make them automatic.

A fluid clutch is one which uses a special fluid to transmit torque from input to output shaft. The disadvantages of such clutches are:

They are expensive
They are bulky
They present efficiency

Respecting this last point, it is necessary to go deeper: Manufacturers mention that these fluid clutches slip only 5%. Nevertheless, that 5% slip represents also 5% of the total power developed by the motor and this loss of power must be evacuated by means of heat sinking "fins" on the clutch case. If we suppose that we are using a motor that develops only 40 HP, that 5% means 1472 watts which, in turn, is the equivalent of a 3 bar electric stove which the driver must carry "ON" everywhere he goes, thus heating the environment at his own cost. This fact, exposed as above, would make any potential buyer desist.

The prior art problems solved by the clutch forming part of this invention are:

It has no friction surfaces. Therefore, there is no wearing to repair, no friction disks to replace. It must be noted that, to replace the disk or a conventional solid clutch, it is necessary to take the motor apart. This job is as expensive as the disk itself.
It is as automatic as a fluid one, but very much simpler and, therefore, cheaper.
It has zero slip in the "closed" position. This means that no wasting of power exists.

NOTE: This clutch is also useful for decreasing the starting current of electric motors that must start assuming heavy loads (cranes, tramways, etc.).

Gear boxes for vehicles, as known today, can be grouped in five mean systems, working by:

a) Displaceable friction surfaces, such as disks, cones, pulleys, etc.
b) Displaceable gears.
c) A combination of epicycloidal gears, internal clutches and internal brakes, manually commanded (Wilson gear box).
d) The same as c) but automatically commanded (Hydramatic box).
e) A combination of d) and a hydraulic torque converter (Power Glide Box).

Disadvantages of the above mentioned systems are, respectively:

a) Abandoned many years ago, due to its low efficiency, high wearing out and unsuitability to transmit power beyond certain limits.
b) In use but it needs a pedal commanded clutch and special fixtures to synchronize the gears before they mesh. The "synchronizers" do not have a long life.
c) Abandoned many years ago, maybe on account of its excessive complications to give four speeds.
d) Good but too complicated.
e) Complicated; low efficiency.

The gear box forming part of this invention keeps all its forward gears in constant mesh. The motor itself makes the speed changes, choosing the suitable speed at any moment. Of course, the invention uses, in any case, a lever to permit the driver to choose among REVERSE—NEUTRAL—DRIVE positions. There is also a position PARKING that works in a similar fashion to conventional automatic transmissions.

A fifth position has been added, which is not precisely the known position LOW because this speed is not necessary if a car including this invention goes forward (at any slope). That fifth position is used specially to control the vehicle when it goes down and to start the motor by pushing the vehicle. As this fifth position (which we will call DOWN) uses a band brake commanded by the driver, it is also useful to decrease quickly the velocity of the car, given it is possible to enter it at any velocity of the car.

The gear box of this invention presents a great degree of elasticity, much more than any other gear box. The advantage of this condition is clear.

SUMMARY OF THE INVENTION

This invention may be used in cars, motorcycles, agricultural machinery and for general purposes. It has the following characteristics:

It is a complete transmission in which both clutch and gear box are completely mechanical. Neither electric nor electronic circuits and neither hydraulic nor pneumatic systems are required.
The clutch has neither friction surfaces nor fluids to transmit torque. The gear box has no friction surfaces in the set of mechanisms which gives the position DRIVE.
All forwards gears are in constant mesh.
Flexibility of the gear box is such that it may automatically effect 50 or 100 speeds changes per minute, for instance, without suffering special wearing out or impacts and without producing noises.
The gear box presents only three speeds, but it can change directly from 3rd to 1st speed (or viceversa), if so required, again without special wear, impacts or noise.
Its construction is relatively simple, so its cost is low in comparison with standard automatic boxes.
The entire transmission is elastic, being able to absorb vibrations of great amplitude.

The transmission is composed of two principal parts:
1. Centrifugal mechanical clutch, acting by inertial effect. This effect is accomplished by masses in symmetrical motion.
2. Automatic gear box, based on action and reaction forces

DETAILED DESCRIPTION

CONSTRUCTION OF THE CLUTCH

Two disks 71 (FIGS. 1 and 2) are joined to each other by means of joining pieces 72. This set, composed of the two disks and its joining pieces, will be called the clutch frame (C.F.) The C.F. is fixed (or welded) to the input shaft 73. Several mechanisms rotate with the C.F., forming in this way a rotating mass of a certain weight as in conventional clutches. As known, this is necessary to provide a flywheel effect, favorable to the motor performance.

Figure 1:
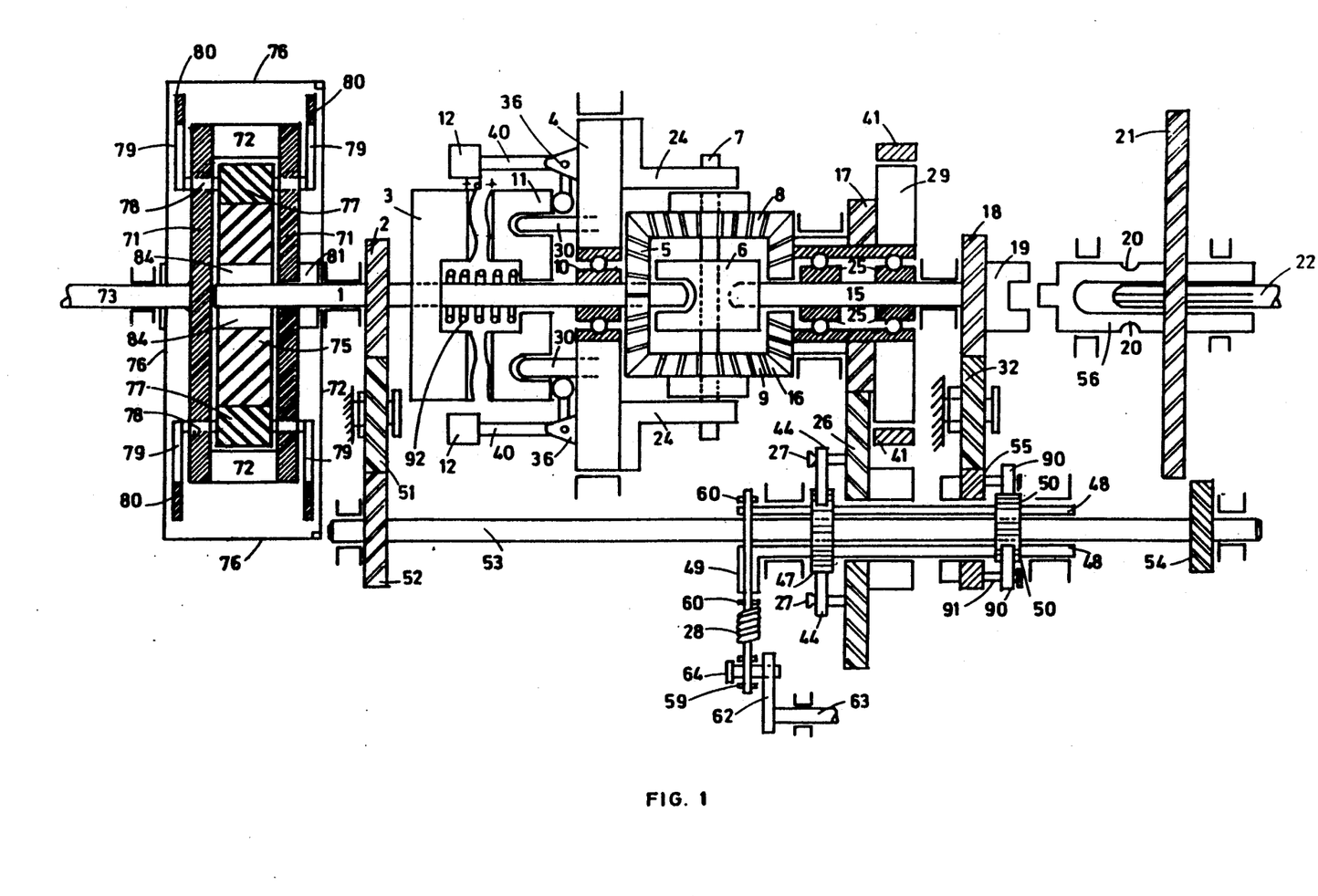
FIG. 1 is a schematic side elevational view of the complete clutch-gearbox set.
Figure 2:
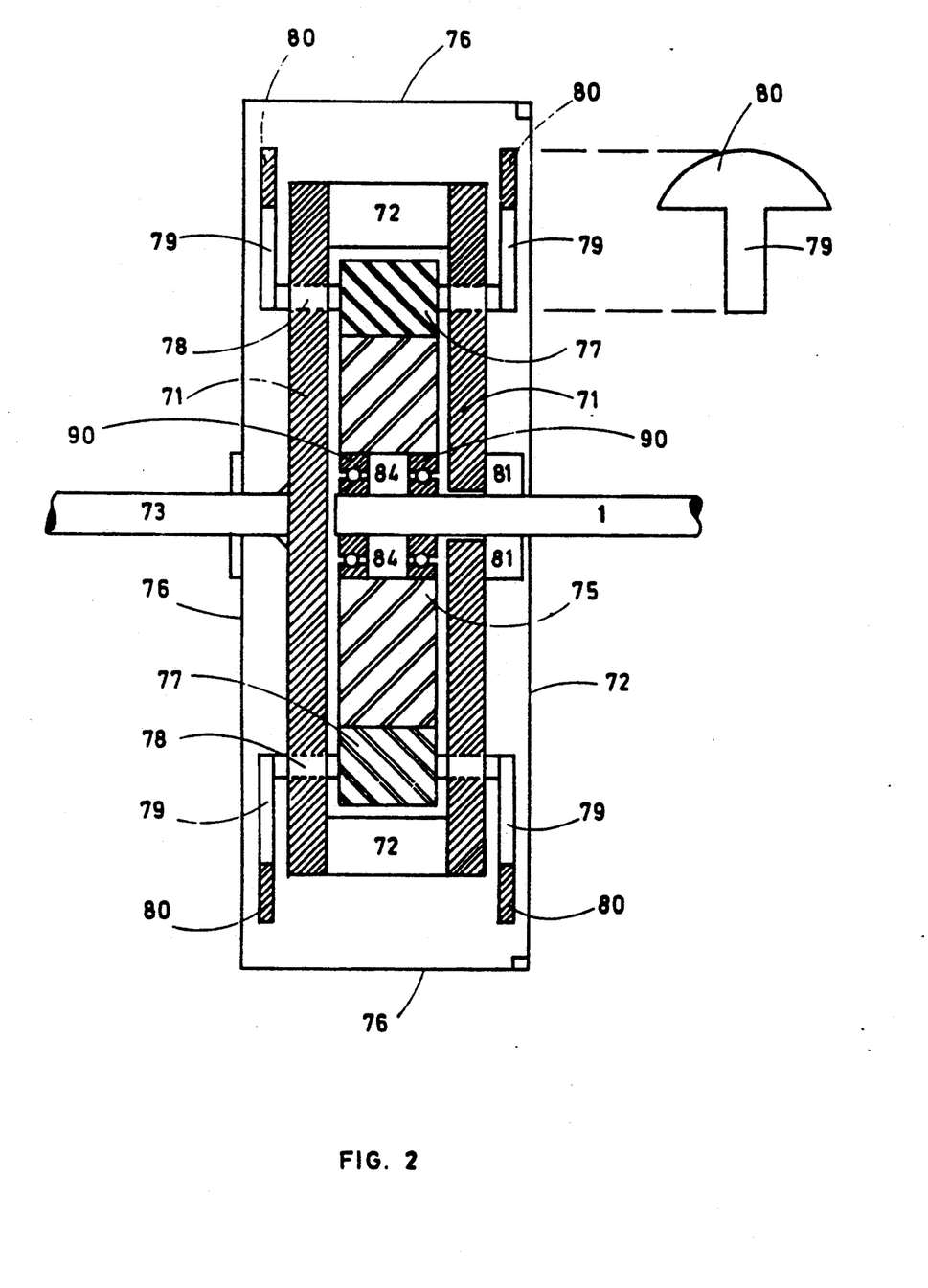
FIG. 2 is an enlarged side elevational view of the clutch.

The output shaft, on the contrary, carries only the gear 75, which is equivalent to the friction disk of a conventional solid clutch. A circular open case 76 acts as a protection cover and is also fixed to the input shaft 73. In turn, the circular cover 72 is bolted to case 76.

It must be noted that parts 72 do not need to be separated but can form a union mantle (cylinder) all around the perimeter of the disks. So, the cylinder serves to store a small quantity of oil to lubricate the gears.

Two identical pinions 77 mesh with gear 75, and the pinions are fixed to shafts 78. The C.F. is crossed by shafts 78. Four rolling bearings (not shown) let shafts 78 rotate freely in the C.F. Four identical arms 79 are fixed to shafts 78 and carry on their ends the masses 80, which must have exactly the same shape and weight.

The pinions 77 synchronize with gear 75 in such a way that masses 80 must occupy simultaneously the farthest ends from the center axle of the system, as shown in FIGS. 1 and 2. In other words, masses 80 must occupy simultaneously the two ends of a system diameter.

An elastic coupling 84 is installed between gear 75 and shaft 1. The roller bearing 90 keeps gear 75 centered without interfering the action of the elastic coupling. Given that many elastic couplings exist, this one has been drawn as a block. A free wheel mechanism 81 is installed between the C.F. and shaft. For the same considerations above mentioned, this mechanism has also been represented as a block. The rotating sense of mechanism 81 is such that, in the same sense of the motor cranking, the C.F. cannot impulse shaft 1 but shaft 1 can impulse the C.F.

AVAILABLE SPACE WITHIN THE C.F.

The available space for masses 80 allows them to be very much larger (except in their width) than the illustrated ones. For instance, instead of the masses being like circular sectors, they can be like complete circles.

There is also space enough to contain another pair of pinions similar to 77 with their respective shafts, arms and masses. If a second pair of pinions is used (90° separated from the first pair), it is convenient to gear them in such a way that the new masses rotate with a shift of 180° with respect to the first pair, thus avoiding almost completely angular vibration.

WORKING OF THE CLUTCH

When the C.F. rotates, impulsed by the input shaft 73, if the output shaft 1 is detained (e.g., vehicle stopped), masses 80 will rotate in circles around their shaft 78 given that pinions 77 are compelled to rotate around gear 75. It can be understood that masses 80 will describe an epicycloid around the central axle of the system.

It must be specially noted that the rotation of masses 80 is always symmetric with respect to the central axle of the system. This means that a straight line, joining the center of one of the masses with the center of the opposite mass, will always pass through the center of the system and be divided in two, precisely in the center of the system.

Figure 3:
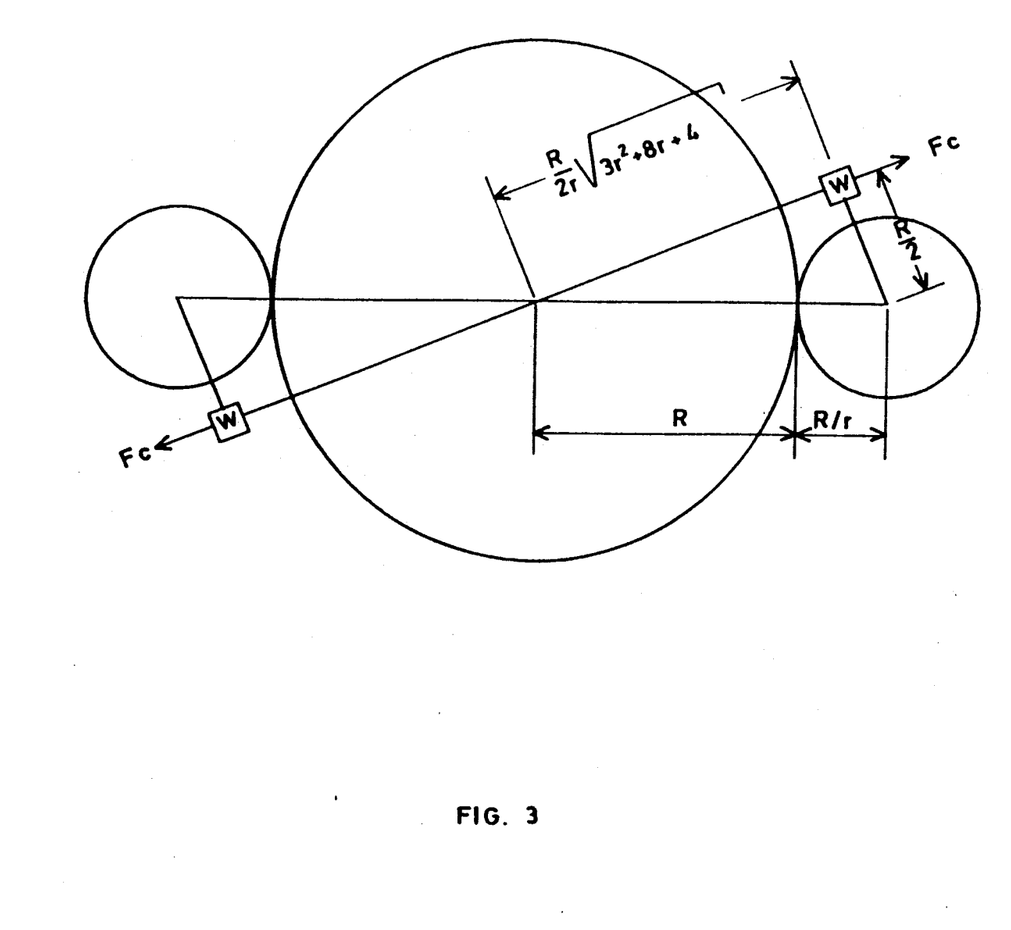
FIG. 3 is a schematic which shows how the clutch works.

Furthermore, at any position of the masses, two congruent triangles will be defined. FIG. 3 illustrates the geometry of the system. This geometry avoids perpendicular vibration with respect to the center axle of the system. Should such vibrations exist, they would exercise strong deflection stresses and bending moments against the input and output shafts. Besides, the entire system would suffer unacceptable vibration. It can easily be understood that such a vibration is avoided by the fact that, at any moment, opposite and equal forces are developed.

The elastic coupling 84 is designed to absorb the angular vibrations produced by the system and is indispensable to "filter" the output torque. Once the filtration is performed, the angular vibration disappears and the torque appears very clearly and has a magnitude that is linearly proportional to the angular speed of the input shaft if the output shaft is stopped. Otherwise, that magnitude will be proportional to the relative speed of both shafts till reaching exactly the ratio 1:1 when the output shaft has reached enough speed.

Let us suppose that this clutch has been mounted in a conventional car, replacing a conventional solid clutch. With the car stopped and while the motor is idling, masses 80 will turn around themselves at such a reduced speed that they will engender only a little torque on the output shaft 1. This is exactly what happens in a hydraulic clutch, and this effect must be resisted by the brake pedal. On accelerating the motor, the speed of masses 80 will also increase and the torque on shaft 1 will also increase.

It has been experimentally proven that the torque produced on the output shaft increases linearly according to the angular speed of the input shaft. As in a conventional clutch, the output shaft begins to take a greater and greater torque from the input shaft.

When the angular speed of shaft 1 is high enough, masses 80, due to centrifugal force, will try to occupy permanently the outer positions from the center of the system. When this action has taken place, the gearing will be inhibited, as seen in FIGS. 1 and 2. Then the system will rotate as a unique mass. This position is reached in a totally progressive way, linearly, as an ideal clutch.

REVERSIBILITY OF THE CLUTCH

This clutch is reversible only in its position "closed"—that is to say, when masses 80 occupy a position that ranges from the position shown in FIG. 2 to the position shown in FIG. 3 (or symmetrically). In many applications to machinery and the like, the above mentioned circumstance will have no effect, but let us suppose that this clutch has been installed in a car. The car begins to descend.

If, at that moment, the car keeps a minimum velocity, there will be no problem since the clutch will stay closed. Nevertheless, if at that moment the speed of the vehicle is so low a to permit the clutch to open, it will be enough if the driver accelerates the motor momentarily to cause the clutch to close and keep closed. In case this requirement does not please the driver or violates security standards, the free wheel mechanism 81 has been provided. This mechanism, together with the brake band 41 of the gear box, gives the necessary reversibility. The set 41-84 is a part of another clutch working in the opposite sense.

MAXIMUM TORQUE THE CLUTCH CAN TRANSMIT

To do this calculation, we will suppose the clutch is working in its position "closed", with masses 80 disposed on two opposite ends of a diameter of the system, as in FIG. 2.

To simplify the resulting equations, we will designate every pair of masses 80 as "2W". Also to simplify, the weight of arms 79 will be neglected, assuming instead that the whole mass belongs to each "2W".

If the torque requirement begins to increase, the "2W" will not be able to start rotating around shafts 78 before they overcome the maximum centrifugal force (Fc) developed by each 2W. This will occur only after the 2W occupy the positions shown in FIG. 3. In this position, a pair of forces is formed giving the maximum torque just before the 2W start rotating around shafts 78.

Let us call R the primitive radius of gear 75.

Let us call r the transmission ratio between gear 75 and pinions 77.

For every effect of the calculation, it will be supposed that each arm 79 has a length=R/2.

Then, the radius about which the 2W rotate around the central axle of the system will be, according to the Pythagorean theorem $$R/2r \sqrt{3r^2 + 8r + 4}.$$

This arm will be valid for the calculation of the Fc developed by the 2W.

The total torque transmitted towards gear 75 will be $$2\, FcR/2r = FcRr \text{ (dynes cm)}$$

$$Fc \text{ will be} = w^2 R/2r \sqrt{3r^2 + 8r + 4} \times w^2$$

$$Fc = Ww^2 R/r \sqrt{3r^2 + 8r + 4} \text{ (dynes-cm)}$$

The maximum torque developed will be $$Tmax = Ww^2 R^2 \sqrt{3r^2 + 8r + 4} \text{ (dynes-cm)}$$

As an example of the application of these formulas, let us suppose we want to design a clutch able to transmit a maximum torque=7 kg m under 4000 r.p.m. The available space for R is only 5 cm and we desire to apply a transmission ratio r=3 towards the pinions.

By doing the necessary replacements, and after translating r.p.m. to rad/seg:

w=21.3 grams

This result is important as an example that, to transmit by means of this clutch a torque which is within commonly used values, the masses 80 may have such a small value that angular vibration will be of little consideration and, therefore, it will be easy to "filter". It is also necessary to take into account that the frequency to filter will be r times the angular speed of the system. This fact will make the filtration easier, exactly as in electricity.

Now, due to the fact that masses 80 may have so small a magnitude, it is not indispensable those masses 80 surpass the C.F., as in FIG. 1, and it will also be possible, therefore, to reduce the total diameter of the clutch. As an additional advantage, neither will it be indispensable to use the box 76 nor its cover 72. These parts may be replaced by simple "eye-lashes" covering both sides of the C.F.

Furthermore, in using this clutch in light vehicles, it is not necessary to use arms 79 or masses 80. It will be enough to bore, in each pinion 77, two diametrally opposite holes, these holes being parallel to the central hole of the pinion. At each pinion, one of the holes will be filled with lead. Of course the lead-filled holes must occupy diametrally opposite places in the system, as was necessary with masses 80.

EXPERIMENTS MADE WITH A SCALE MODEL OF THE CLUTCH

Elements a) Rotating drum driven through the clutch by variable speed electric motor. The drum rolls a rope hoisting a weight, like in cranes.

b) Prony's brake moved through the clutch by variable speed electric motor.

c) Flywheel.

d) Torque measurer for the input shaft of the clutch.

EXPERIMENT 1

The drum hoists a determinated weight from the floor. While motor rotates at reduced speed. The rope becomes tense, but the weight stays on the floor.

By increasing the motor speed, the weight begins to be hoisted. Increasing again the motor speed, the weight goes up at increasing speed. Now, by reducing slightly the motor speed, the weight can be suspended at the same level.

Upon interrupting the electrical current sent to the motor, the weight falls.

EXPERIMENT 2

Prony's Brake is tighten until it cannot slide. The motor is started. The input shaft of the clutch rotates but the output shaft is stopped by a weight on one of the arms of Prony's brake. The magnitude of the weight must be such that the 2 arm lever stays horizontal.

Now, it can be proven that the more we increase the motor speed, the more we can increase the weight. It is easy to plot the graph of this experiment. The abscissa axis represents the different magnitudes of the output torque. The different speeds of motor, in r.p.m., are represented on the ordinate axis.

The result is a practically straight line passing through the origin.

EXPERIMENT 3

The flywheel is fixed to the output shaft of the clutch. The motor is started rudely. Then, at the first moments, a great difference of speed can be measured between input and output shafts of the clutch, but this difference decreases progressively until it reaches exactly zero.

EXPERIMENT 4

By measuring the input torque sent to the clutch, it is possible to realize that, at any moment, the input torque is equal to the output torque.

THE GEAR BOX

As explained, FIG. 1 presents a view of the clutch-gear box set. This sketch is enough to fully understand the building and working of the gear box. Note the slot 20, which is destined to receive the fork (not illustrated) which, in turn, lets the slotted piece 56 to be slid along shaft 22 from the hand lever commanding the gear box.

The hand lever may set the gear box at any of the following positions:

DRIVE—NEUTRAL—REVERSE—DOWN—PARKING

In FIG. 1, the gear box has been drawn in NEUTRAL position.

It must be noted that the well known position LOW has been replaced by the position DOWN. This position, like the position PARKING, can also be changed by the hand lever. In the position DOWN, band 41 is applied over drum 29 by means of a not illustrated mechanism.

The mechanism belonging to position PARKING is similar to that of conventional automatic gear boxes and, for that reason, has not been illustrated.

In the position DRIVE, the box will select automatically one of the 3 following forward speeds:

1st speed, ratio 3.5:1 (or another ratio, according to its design)
2nd speed, ratio 2:1 (or another ratio, according to its design)
3rd speed, ratio 1:1

The mentioned ratios were used in an experimental scale model built according to FIG. 1.

CONSTRUCTION OF THE GEAR BOX

Due to the fact that a reasonable quantity of helical gears has been employed in this design, to simplify explanation, the abbreviation H.G. will be used. Should the H.G. be small, the work "pinion" will be used.

The input shaft 1 is fixed to the following pieces: H.G. 2, sine shaped teeth wheel 3, inner key or wall of rolling bearing 10 and conical pinion 5. Said shaft 1 crosses freely over the sine shaped teeth wheel 11 and its right end enters freely into the brass cylinder 6. This cylinder is crossed over by shaft 7, which is fixed to the cylinder. On both sides of shaft 7, conical pinions 8 and 9 can rotate freely.

The outer keg or wall of rolling bearing 10 is fixed to disk 4.

The following parts are bolted to disk 4: other)
2 squares 24 (180° from each
8 forks 36 (45° from each other)
4 pins 30 (90° from each other)

For clearness of the sketch, only two parts of each of the above mentioned have been drawn.

Squares 24 are fixed to each end of shaft 7. Wheels 3 and 11 have sinusoidal teeth perpendicular to them. Wheel 11 can slide along shaft 1 but it is compelled to rotate together with the disk 4 by the actions of pins 30.

It will be seen that both wheels 11 and 3 form a soft coupling, since the profiles of their teeth present the form of a very extended sinusoid. Moreover, it will be difficult since, on pressing one wheel against the other one, they keep slipping for a long time since, on account of their teeth shape, there will be a situation very similar to an unstable equilibrium. However, on pressing softly one wheel against the other. This special coupling will be soon closed.

8 counterweights 12, mounted on right angle arms 40, may develop the necessary centrifugal force to press progressively wheel 11 against wheel 3. A central spring 92 tends to separate them in absence of centrifugal force.

Arms 40 pivot in forks 36.

The distance "d must be such that both wheels 3 and 11 are completely uncoupled in absence of centrifugal force.

The right end of cylinder 6 is fixed to the left of shaft 15.

A triple piece composed of brake drum 29, conical pinion 16 and pinion 17 (all fixed to each other) may rotate freely around shaft 15 by means of rolling bearing 25.

Pinion 18 is fixed to the right end of shaft 15. The bucket of pinion 18 has been planed to give it the shape of a female coupling.

Bucket 56 (a part of H.G. 21) is internally striated to fit external striae belonging to the left end of output shaft 22.

Bucket 56, moreover, has been lathed to receive the circular slot 20 and planed to shape its end into the protruding form that will enter female coupling 19. So, H.G. 21, together with its bucket 26, may be slid along shaft 22, but both H.G. 21 and shaft 22 must rotate together.

Pinion 17 meshes with H.G. 26 which rotates freely around hollow shaft 48.

H.G. 26 carries bolts 27 around which pawls 44 pivot. These pawls are permanently forced to the inside by means of a couple of springs (not illustrated). Of course, said springs rotate together with H.G. 26.

The hollow shaft 46 is fixed to free wheel pinions 47 and the left end of hollow shaft 48 has been lathed eccentrically.

Pinion 16 meshes with crazy pinion 32 and this, in turn, meshes with pinion 55. This pinion 55 interacts with the free wheel pinion 50 in a similar way to that already explained for the free wheel pinion 47.

If we look at the H.G. 26 from the input shaft 1, we shall appreciate that said H.G. can drive shaft 48 only clockwise. H.G. 55, on the contrary, can drive shaft 48 only counterclockwise.

Of course, any other type of free wheel mechanism could be used, but this one can be better shown in a sketch.

H.G. 2 meshes with crazy H.G. 51 and this, in turn, meshes with H.G. 52, which is fixed to shaft 53. A pinion 54 is fixed to the right end of shaft 53.

An extension spring 28 may "beat" freely between eccentric 48 and bolt 64 through rolling bearings 59 and 60, drawn in a simple form. Bolt 64 is fixed to crank 62 and this, in turn, is fixed to shaft 63. This last set lets spring 28 be adjusted according to the desired stress.

DESIGN CONSIDERATIONS

Shaft 48 is made hollow to pass through the reverse shaft 53, thereby reducing the size of the gear box. If available space is not a problem, shaft 53 may take any other position. In this case, the eccentrical end may be replaced by a crank.

Spring 28 has been drawn vertically only for clearness. Actually, the set 28-62 63 is at an inclined position to reduce space requirements therefor.

The transmission ratios in the scale model are:
H.G.2:H.G 1:H.G.52=1:1:1
Conical 5:Conical 8:Conical 9:Conical 16=1:1:1:1
H.G.55:H.G.32:H G 18=1:1:1
H.G.17:H.G.26=7:5
Pinion 54:H.G.21=4:1 (replaceable by:
HG2/HG51/HG52/HG54/HG21=2/1/1/2/1

WORKING OF THE GEAR BOX

Throughout this explanation, it will be supposed that, if we look at the gear box from the clutch, shaft 1 rotates clockwise.

Working in NEUTRAL position (as seen in FIG. 1)

Rotation of input shaft 1 reaches only until coupling 19 and pinion 54.

Working in REVERSE position (keg 56 fully displaced to the right)

The transmission of force is:
Shaft 1—H.G 2—H.G.51—H.G.52—shaft 53—pinion 54—H.G. 21—keg 56—output shaft 22. Transmission ratio=4:1.

Working in the DRIVE position (key 56 fully displaced to the left; coupling 19 engaged)

FIRST SPEED: When the clutch begins to transmit its rotation to shaft 1, this rotates together wheel 3 and pinion 5. At first, when the vehicle is stopped, output shaft 22 will resist rotation as will shaft 7 which is now fixed to shaft 22. Then, the rotation of conical pinion 5 will be transmitted to both conical pinions 8 and 9. As a result, conical pinion 16 will rotate in an opposite sense to that of conical pinion 5. The negative torque of pinion 16 is the reaction of force received by shaft 1, and this reactive force is transmitted to the output shaft 22 according to the following transmission:

Pinion 16—pinion 17—H.G.26—bolts 27—pawls 44—free wheel 47—hollow shaft 48—free wheel 60—pawls 90—bolts 91—H.G.55—H.G.32—H.G.18—coupling 19—keg 56—output shaft 22. Transmission ratio—3.5:1.

Due to shaft 48 rotating, spring 28 will be shaking or beating, but it is necessary to take into account that the energy this spring takes from the motor to extend itself is returned to the vehicle wheels when the spring shrinks. The only power lost is that of friction across rolling bearings 59 and 60. This can be appreciated in the scale model, where spring 28 works as softly as if it did not exist.

First speed is characterized by:
Pawls 44 and 90 engaged. H.G. 26 rotates in the same sense as shaft 1. Shaft 48 rotating.

SECOND SPEED: As the vehicle increases its speed, the reaction force received by pinion 16 begins to decrease and continues to decrease until spring 26 is able to stop shaft 48. The reaction force will go on being received by this spring but only to the point of keeping it slightly extended. In other words, the torque received by input shaft 1 will be equilibrated by the torque created by the product of the radius of eccentric 49 and the force developed by spring 28. Shaft 48 will stop rotating and, as conical pinion 16 is also stopped, the transmission ratio from input to output shaft of the gear box will change to 2/1.

The force developed by spring 28 may be graduated by rotating shaft 63. This adjustment may be normally fixed or be commanded from a centrifugal regulator fixed to the output shaft, according to convenience.

Second speed is characterized by:
Pawls 44 engaged: pawls 90 slipping: H.G. 26 stopped: Shaft 48 stopped.

THIRD SPEED (DIRECT): When disk 4 rotates at the same speed as the output shaft 22, the counterweights 12 will develop a centrifugal force proportional to the square of the vehicle's speed. When this speed is enough, the coupling 3-11 will close neatly, thereby blocking the differential gears 5-8-9-16, which will rotate now as a whole. The transmission ratio will be 1:1.

This speed is characterized by:
Both pawls 44 and 90 are slipping: H.G.26 rotates in opposite sense than shaft 1; Shaft 48 stopped.

The whole above-explained process is repeated in an opposite sense when the gear box is at 3rd speed and the vehicle's speed decreases or it happens that the torque requirement goes up. For this case, there is an additional advantage: If the driver accelerates rudely or the vehicle takes suddenly a rude slope, the box will change directly from 3rd to 1st speed. This step, as has been noted, occurs without impacts, noises or vibrations in the gear box. This is because the rotating elements assume progressively equal speeds that permit them to engage.

FORCE INVERTED (wheels pushing the motor)

In this situation, if the box is in 3rd speed, this condition will be kept, especially if the vehicle tends to increase its speed. However, if it is desired to "hold" the vehicle in a better way, the driver can engage the position DOWN.

Working in DOWN position

It has already been explained how the box works in 2nd speed by fixing H.G.26. If this same action is accomplished by means of the brake which stops drum 29, the box will keep 2nd speed for any condition. This is exactly what is done by clamping the manual lever in the position DOWN. Note that if band 41 is self excitated, the force of the band will be enough, a hydraulic brake not being necessary.

So, on applying band 41 to drum 29, the box will take, anyway, the second speed. This action is useful to start the motor by pushing the vehicle, to help or replace braking when the vehicle is going downhill, and also as an emergency brake to effectively reduce the vehicle's speed.

Working in PARKING position

A mechanical finger, commanded by the lever, fetters output shaft 22.

OPTION 1: We will call "link zone" the time interval initiated when the centrifuqal force produced by counterweights 12 begins to overcome the resistance spring 92 and finished with the full engagement of coupling 3-11.

The force developed by spring 92 must be such that the link zone is within the limits of velocity for which the box needs to change from 2nd to 3rd speed or vice versa. If, in experimenting with this gear box in a car, it is found that such link zone is excessively long, coupling 3-11 can be replaced by the system crank 23-spring 14 illustrated in FIG. 4. This system has no link zone, but its dynamic equilibrium is more difficult than that of the former system. Also, in this case, the energy taken by spring 14 from the motor to extend, is returned to the vehicle's wheels when the spring shrinks.

Figure 4:
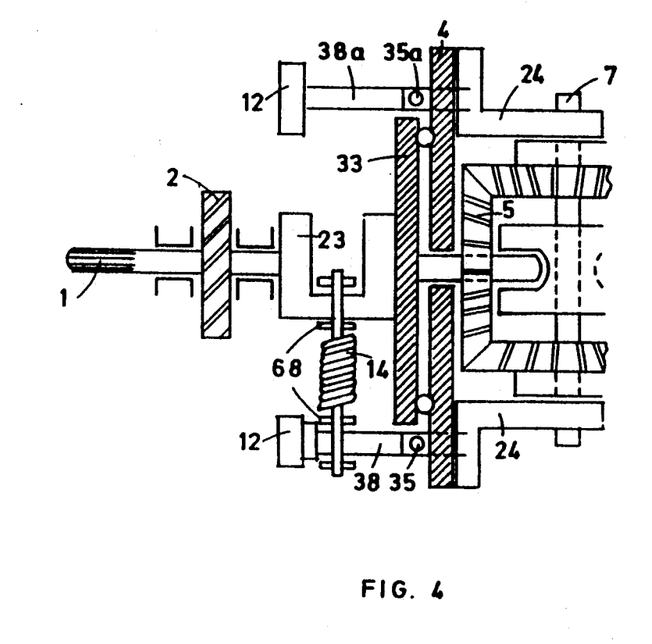
FIG. 4 is a fragmentary side elevational view of an alternative gear box input.

Disk 4 is now a part of a rolling bearing which tends to counteract the deflection stresses produced by spring 14. Disk 33 is fixed to crank 23. Arms 38 may be rigidly supported by disk 4 or ca be articulated to respond to the centrifugal force developed by means of weights 12, so profiting from the fact that disk 4 is fixed to the output shaft 22 so that the angular speed of the disk will be proportional to that of the vehicle's wheels.

Spring 14 will introduce another elastic element to the box, thus improving its performance in 3rd speed. In this case, the box will transmit the torque through the set spring 14-crank 23. The spring will extend until the point at which the force developed by it, multiplied by the length of arm 23, is the torque transmitted. Should the torque exceed this value, spring 14 will begin to shake or beat, so letting the torque pass free. The box will take 2nd speed.

If spring 14 is shaking, it means that the box is in 2nd or 1st speed.

OPTION 2: There is a second option to replace the coupling 3-11. This option is to install, instead of such coupling, a clutch similar to the main clutch of the transmission (FIG. 2).

It must be noted that what is pursued in coupling 3-11 is a net closing at a determined speed and, at the same time, a degree of progressiveness with respect to the vehicle's speed. This is exactly what the main clutch does and, for this reason, the set 3-11 plus its annexed mechanisms may be replaced by a set similar to 71-84.

From the experiments mentioned above, especially experiment 4, if can be deduced that the clutch can behave also as an "energy absorber" by simply breaking its central gear and applying a torque to the C.F. The more the angular speed applied, the more will be the energy absorbed, as in a loaded electricity generator.

So, if we add another clutch system at the end of the transmission in such a way that in this clutch the central gear can be handled or acted by a self-locking band, the vehicle can be held in descents, when the driver releases the accelerator. The self-locking brake may be activated, for instance, by means of a piston moved by the vacuum produced in the intake manifold.

From the description of Option 2, the second option to replace coupling 3-11 should simplify this automatic transmission.

As already set forth, the use of four planetary gears shifted 90° imparts to this clutch the necessary performance.

As also already explained, the weights and arms linked to the planetary gears can be dispensed with, since by just drilling the pinions sufficient centrifuqal force is developed. Now, it must be considered that, the longer the planetary pinions, the more will the centrifugal force develop, since the amount of drilled material will be larger. Also, the fact of the pinions being longer helps them to transmit a greater force.

Figure 5:
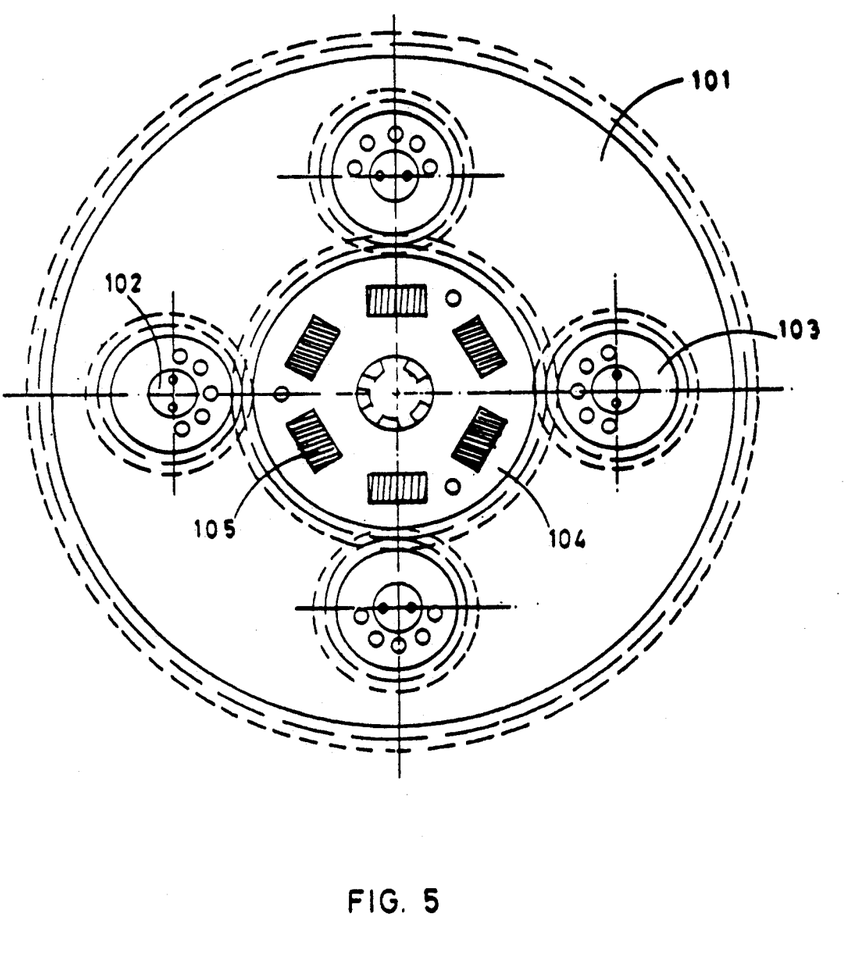
FIG. 5 is an enlarged front elevational view of the clutch.

FIG. 5 shows how this was accomplished in an automotive clutch:

The fly-wheel of the motor (101) was removed and planed. Four shafts (102) were fixed to the fly-wheel using the necessary bearings (these bearings not being shown).

Four drilled planetary pinions (103) can rotate freely around shafts (102).

The heavier parts of the pinions (more properly, their centers of gravity) are shifted exactly and permanently by 90°.

The old friction disk was transformed into the sun gear (104).

The same old springs (105) forming part of the old disk were used to dampen.

The results of this combination are:

The car was propelled from still to maximal linear speed (gear box at 1st. speed) better than when the old clutch was used.

There were no vibrations or shakes.

Total progressiveness.

The clutch coupled at a 1:1 ratio over a 10 m stretch, then got the necessary reversibility.

I claim:

1. A mechanical-centrifugal clutch, without friction surfaces, comprising:

(A) planetary support means for receiving input torque;
   (B) sun gear means for delivering output torque without any free-wheeling mechanism; and
   (C) a plurality of at least four weighted planetary gear means driven by said planetary support means and driving said sun gear means, said weighted planetary gear means including centrifugal effect masses and being disposed in a special relative shift relative to one another for imparting substantial continuity in the transmission of power.

2. The clutch of claim 1 wherein said plurality is four, and said weighted planetary gear means are shifted relative to one another by ninety degrees.

3. The clutch of claim 1 wherein said plurality of weighted planetary gear means are disposed as multiple pairs of weighted planetary gear means.

* * * * *